United States Patent [19]

Murakami et al.

[11] Patent Number: 4,625,564

[45] Date of Patent: Dec. 2, 1986

[54] VORTEX FLOW METER

[75] Inventors: Hideo Murakami; Naoki Matsubara, both of Tokyo, Japan

[73] Assignee: Oval Engineering Co., Ltd., Tokyo, Japan

[21] Appl. No.: 676,752

[22] Filed: Nov. 30, 1984

[30] Foreign Application Priority Data

Dec. 2, 1983 [JP] Japan ................................ 58-228052
Jul. 27, 1984 [JP] Japan ......................... 59-113403[U]

[51] Int. Cl.$^4$ ............................................... G01F 1/32
[52] U.S. Cl. ............................. 73/861.24; 73/DIG. 4
[58] Field of Search ........... 73/861.22, 861.24, 861.21, 73/DIG. 4

[56] References Cited

U.S. PATENT DOCUMENTS

4,248,098  2/1981  Sawayama et al. ............... 73/861.24
4,526,040  7/1985  Matsubara ........................ 73/861.24

Primary Examiner—Herbert Goldstein
Attorney, Agent, or Firm—Jordan and Hamburg

[57] ABSTRACT

A vortex flow meter includes a vibration sensing element having a sensor responsive to an external vibration and a sensor responsive to a vortex train at vertically opposite ends thereof. The sensing element is fixed to a conduit fulcrumed at an intermediate portion thereof. A vortex shedding member is integrally and oscillatably mounted in a lower portion of the sensing element. The flow meter can be assembled merely by being positioned in the conduit and, due to an integral structure, it is effectively applicable even to small diameter conduits through which fluids flow at very small flow rates. In a path along which leads from a sensor responsive to pressure variations due to vortex trains are routed to a transducer box, vibration of the transducer box is prevented from reaching the sensor via the leads, thereby rendering the flow meter less susceptive to externally derived vibrations.

16 Claims, 8 Drawing Figures

VORTEX FLOW METER

BACKGROUND OF THE INVENTION

The present invention relates to a vortex flow meter for measuring a flow rate of a fluid based on Karman vortex streets, or vortex trains.

A vortex flow meter is well known in the flow measurement art in which a vortex shedding member is positioned across a passageway inside a conduit through which a fluid flows. The velocity or flow rate of the fluid in the conduit is measured by sensing pressure variations of the fluid caused by vortex trains. In this kind of flow meter, mechanical and other vibrations attributable to mechanical vibrations of the conduit, turbulent flows of the fluid itself, pulsation of a pump, and the like are apt to appear as errors in an output signal of the flow meter. For the compensation of such errors in measurement, it has been practiced to use a sensor responsive to mechanical vibrations and a sensor responsive to vortex trains and provide a difference between output signals of the two sensors. The problem with such an approach is that the two sensors are constructed integrally with each other but separately from the vortex shedding member and, therefore, have to be assembled independently of the latter. Especially, where the flow meter is small size, difficulty is encountered in machining and assembling it, resulting in an inefficient procedure. Another problem is that since the pressure variation due to a vortex train is proportional to the square of a flow rate, the flow meter needs be responsive to a wide range of pressures and, hence, its sensitivity is very low when flow rate is small. Such has hitherto been coped with by using a preamplifier having a gain which is small for large flow rates and large for small flow rates, i.e. a substantially constant total gain. However, the preamplifier with such a characteristic is susceptive to externally derived vibrations of low frequencies which constitute a source of noise. Attempts have been made to provide a stably operable vortex flow meter by compensating for the external vibrations or allowing a minimum of external vibrations to effect the measurement.

SUMMARY OF THE INVENTION

It is therefore an object of the present invention to provide a vortex flow meter capable of effectively compensating for errors in measurements due to external noise.

It is another object of the present invention to provide a vortex flow meter suitable for measurement of small flow rates.

It is another object of the present invention to provide a vortex flow meter capable of being installed with ease in a conduit through which a fluid is flowing.

It is another object of the present invention to provide a vortex flow meter which is fixed to a conduit fulcrumed at an intermediate portion of a vibration sensing element, which carries a vortes shedding member at an end thereof, and provided with a vortex sensor at a lower portion of the vibration sensing element and an external vibration sensor in an upper portion of the same, thus having the vortex shedding member and the vibration sensing element assembled integrally with each other.

It is another object of the present invention to provide a vortex flow meter furnished with an improved structure for allowing a minimum of external vibrations to act thereon.

It is another object of the present invention to provide a generally improved vortex flow meter.

In one aspect of the present invention, there is provided a vortex flow meter having a conduit and a vortex sensing body which is detachably mounted in the conduit through a seal portion. The flow meter comprises a vortex shedding member, a vortex signal sensor, a fixing flange and an external vibration sensor which are sequentially and integrally arranged to constitute the vortex sensing body, the vortex sensing body being rigidly connected to the conduit at the fixing flange, the vortex signal sensor and the external vibration sensor being interconnected in such a manner as to cancel an externally derived vibration which acts on the vortex sensing body.

In another aspect of the present invention, there is provided a vortex flow meter comprising a thin-walled cylindrical tube extending throughout a center of a mounting flange and provided with a pressure receiving plate at a lower end thereof, sensing elements integrally mounted in the thin-walled cylindrical tube for converting a small pressure variation acting on the pressure receiving plate to an electrical signal, a flexible tubular member rigidly connected to the mounting flange coaxially with the thin-walled cylindrical tube in such a manner as to surround the thin-walled cylindrical tube, a hermetically sealed elastic narrow tube connected at one end to the flexible tubular member, a hermetically sealed terminal block connected to the other end of the narrow tube, the electrical signal being outputted sequentially via the flexible tubular member, the elastic narrow tube and the terminal block, and a protective tube slidably coupled on an outer periphery of the terminal block and fixed in place while surrounding the flexible tubular member, the elastic narrow tube and the mounting flange.

In accordance with the present invention, a vortex flow meter includes a vibration sensing element having a sensor responsive to an external vibration and a sensor responsive to a vortex train at vertically opposite ends thereof. The sensing element is fixed to a conduit fulcrumed at an intermediate portion thereof. A vortex shedding member is integrally and oscillatably mounted in a lower portion of the sensing element. The flow meter can be assembled merely by being positioned in the conduit and, due to an integral structure, it is effectively applicable even to small diameter conduits through which fluids flow at very small flow rates. In a path along which leads from a sensor responsive to pressure variations due to vortex trains are routed to a transducer box, vibration of the transducer box is prevented from reaching the sensor via the leads, thereby rendering the flow meter less susceptive to externally derived vibrations.

DESCRIPTION OF THE PREFERRED EMBODIMENTS

While the vortex flow meter of the present invention is susceptible of numerous physical embodiments, depending upon the environment and requirements of use, substantial numbers of the herein shown and described embodiments have been made, tested and used, and all have performed in an eminently satisfactory manner.

Figure 1:
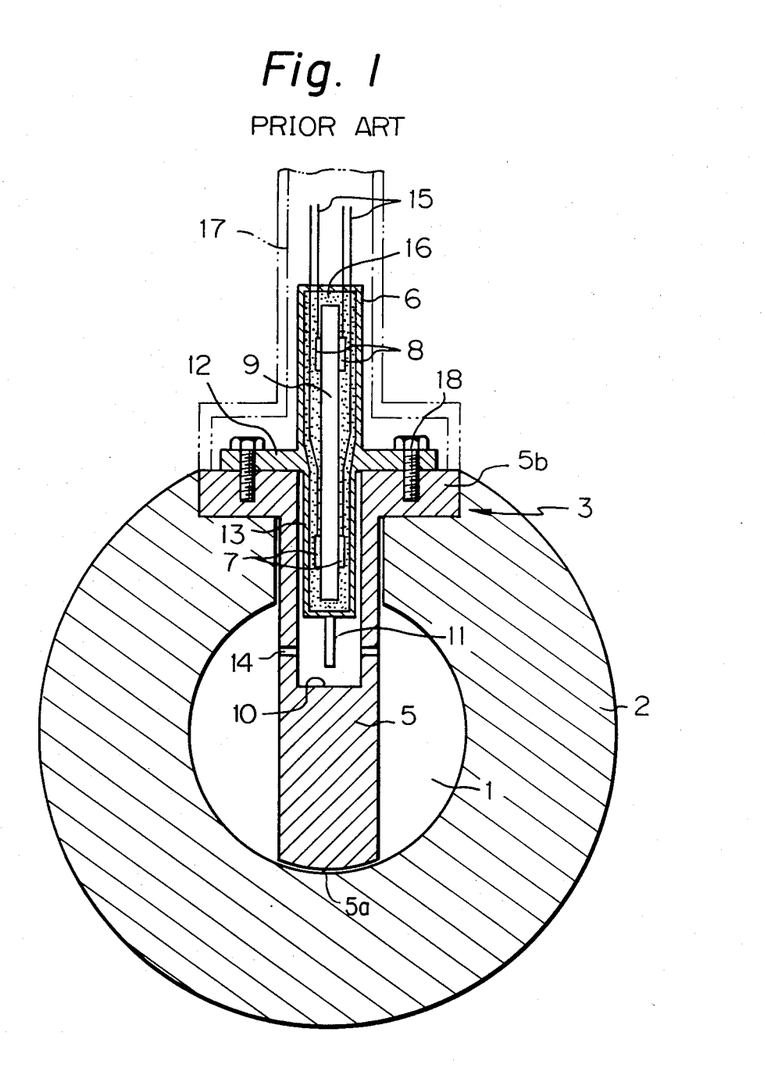
FIG. 1 is a section of a prior art vortex flow meter.

Referring to FIG. 1 of the drawings, a conduit 2 has thereinside a passageway 1 through which a desired fluid flows. The conduit 2 is flanged at opposite ends thereof. The prior art vortex flow meter comprises a body 3 which is located in an intermediate position of the conduit 2. A vortex shedding member, or shedder, 5 extends substantially along a diameter of the passageway 1 and is free at its lower end 5a and securely connected to the conduit 2 at its upper end 5b. A vibration sensor assembly, generally 6, carries sensor elements 7 responsive to a vortex signal at its lower end portion and sensor elements 8 responsive to external vibrations other than the vortex signal such as mechanical vibrations imparted to the passageway 1 at its upper end portion. Specifically, the sensor elements 7 and 8 are commonly fixed to a flexible support member 9 by molding. The vortex shedder 5 is formed with a bore 10 in its upper portion. The lower end of the vibration sensor assembly 6 is inserted in the bore 10 to such a degree that the lower sensor elements 7 are buried in the bore 10 together with a tongue 11, which extends from the bottom of the assembly 6. The assembly 6 is securely yet oscillatably connected to the vortex shedder 5 at a flange 12, which is located intermediate between the ends of the assembly 6 to serve as a fulcrum. The portion of the element inside the bore 10 is spaced a short distance from the wall of the bore 10, while the vortex shedder 5 is provided with openings 14 at opposite ends thereof where a vortex train will be shed.

In operation, as the vortex shedder 5 sheds a vortex train, a pressure variation occurs in the fluid flowing through the passageway 1 and it is communicated to the bore 10 of the vortex shedder 5 through the openings 14. The resulting change in the condition of the fluid inside the bore 10 is sensed by the tongue 11 so that the vibration sensor assembly 6 is caused to swing to the right and left fulcrumed by the flange 12. The sensor elements 7 sense such oscillation of the assembly 6 to generate a vortex signal.

Now, mechanical vibrations originating from the turbulence caused in the passageway 1 or turbulent flows of the fluid itself as well as pump pulsation are often reflected by errors in a signal derived from the vortex train, which is shed by the vortex shedder 5. In the prior art arrangement of FIG. 1, the mechanical vibrations are sensed by the sensor elements 8 which are disposed on the sensor assembly 6 and above the flange 12 and, among them, those common in direction to the movement of the vortex shedder 5 are eliminated as error signals with special concern. Such allows only a correct vortex signal to be picked up and, thereby the flow rate to be measured with accuracy.

Also shown in FIG. 1 are leads 15 led out from the sensor elements 7 and 8, a molding 16 of resin, a protective tube 17 for supporting a gauge and others at its upper end while covering the sensor assembly 6, and bolts 18 for fastening the flange 12 to the vortex shedder 5.

In the above construction, the sensor elements 8 responsive to mechanical vibrations and the sensor elements 7 responsive to vortex trains are built in a physically unitary structure but seprate from the vortex shedder 5. Hence, the sensor elements 7 and 8 have to be assembled independently of the vortex shedder 5 at the sacrifice of efficiency. The inefficiency is particularly pronounced in the case of a small-size vortex flow meter with a small bore 10.

Figure 2:
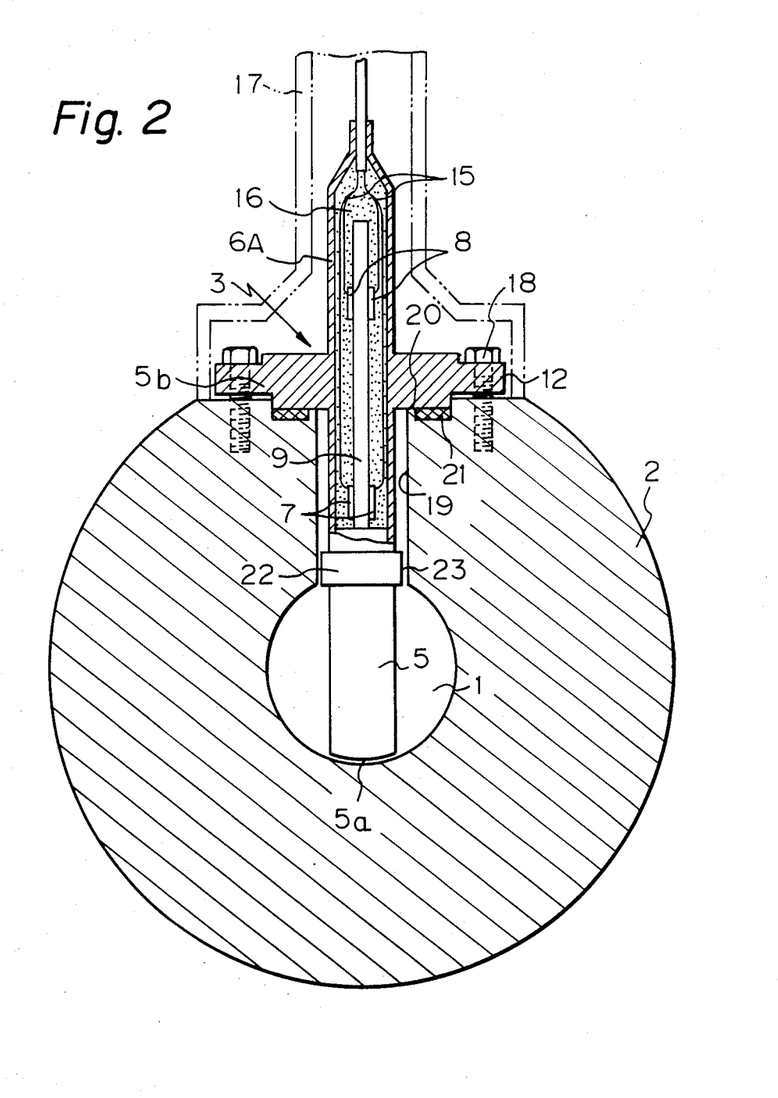
FIG. 2 is a section of a vortex flow meter embodying the present invention.

Referring to FIG. 2, a vortex flow meter embodying the present invention is shown. In FIG. 2, the same or similar structural elements as those shown in FIG. 1 are designated by the same reference numerals and detailed description thereof will be omitted for simplicity.

In FIG. 2, a vibration sensor assembly 6A carries a vortex shedder 5 rigidly at its lower end and has a flange 12 at its intermediate portion. The flange 12 is fastened to a cylindrical conduit 2 by means of bolts 18. The conduit 2 has a passageway 1 thereinside. The flange 12 is positioned by a stepped wall 20 which is formed at the top of a through bore 19, while a packing 21 is disposed in a peripheral portion of the stepped wall 20. The vortex shedder 5 is enlarged in its base portions as at 22 to reduce the spacing 23 between the vortex shedder 5 and the wall of the through bore 19.

In operation, the vortex shedder 5 sheds a vortex flow in a fluid flowing through the passageway 1 of the conduit 2 and oscillates in proportion to a flow rate of the fluid. Sensor elements 7 in a lower portion of the sensor assembly 6A sense the oscillation of the vortex shedder 5.

Vibrations undesirable for measurement, such as mechanical ones caused by the flow of the fluid and those derived externally to act on the passageway 1, are sometimes imparted to the passageway 1 in the same direction as the oscillation of the vortex shedder 5. Such a kind of vibrations obviously appear as an error signal and, therefore, need be eliminated. This is implemented in the illustrative embodiment by upper sensor elements 8 on the sensor assembly 6A. Specifically, the sensor elements 8 constantly sense the undesirable vibrations so that their output is subtracted as an error from that of the lower sensor elements 7, i.e. vortex signal. The vortex flow meter, therefore, succeeds in accurately measuring a flow rate all the time. Meanwhile, the vortex flow meter can be readily assembled by fixing the sensor assembly 6A to the conduit 2 with a fulcrum defined between the upper and lower sensor elements 7 and 8 and rigidly connecting the vortex shedder 5 to the bottom of the element 6A. In addition, due to the unitary structure, the vortex flow meter may easily be designed for use with small diameter conduits in which fluids flow at very small flow rates.

Figure 3:
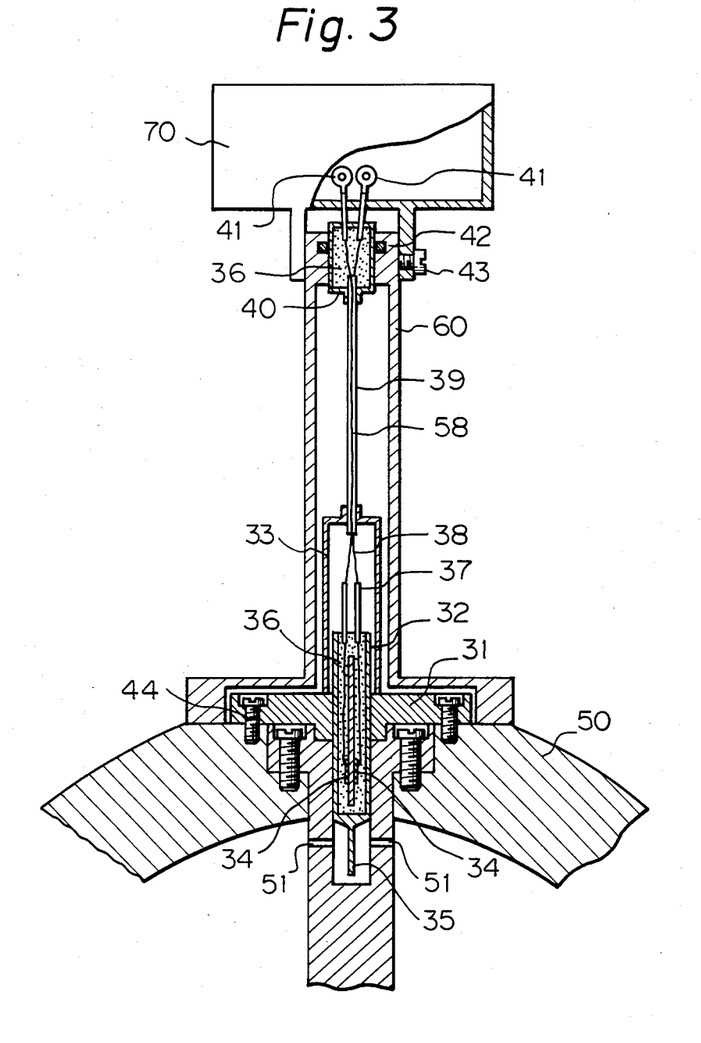
FIG. 3 is a fragmentary section of another embodiment of the present invention.

Referring to FIG. 3, another embodiment of the present invention is shown which is provided with a unique structure for preventing externally derived vibrations from acting on electrical signals, which are output from sensor elements and passed through leads, and reaching a sensor unit to appear as noise in a pressure signal.

In FIG. 3, a sensor is shown as being mounted in a conduit and in a section as viewed in a direction perpendicular to a direction in which a pressure variation acts on the sensor. The reference numeral 31 designates a flange. A cylindrical tube 32 having a relatively thin wall extends throughout the flange 31 and has a pressure receiving plate 35 at its bottom. The flange 31 is fastened to a vortex flow meter 50 by screws 44. A vortex train originating from the flow of a fluid in the conduit develops a delicately pressure variation which is imparted to the pressure receiving plate 35 via openings 51 to act on the thin-walled tube 32. The force acting on the tube 32 is transformed by sensor elements 34 such as piezoelectric elements into a quantity of electricity which is then led out of the tube 32 by leads 37. An insulating material 36 such as resin or glass fills the space between the tube 32 and the sensor elements 34.

The electrical signal generated as stated above is coupled to insulated thin lines 38 and, therefrom, to an input terminal of an amplifier (not shown) inside a transducer box 70 via terminals 41 of external leads. These leads are connected to the sensor elements 34 within the flexible tube 33 and to the terminals 41 of the external leads within a hermetically sealed terminal block 40. A thin-walled elastic narrow tube 39 made of stainless steel or the like is hermetically sealed and rigidly connected at one end to the tube 33 and at the other end to the terminal block 40 by welding, for example. In this particular embodiment, the elastic narrow tube 39 comprises a sheath wire. The other end of the hollow tube 33 is fixed to the flange 31. Inside the terminal block 40, as inside the tube 32, an insulating material such as resin or glass sealingly retains the leads. The outer periphery of the terminal block 40 is slidably and sealingly retained by a protective tube 60 with the intermediary of an elastic sealing member 42. The other end of the protective tube 60 is rigidly connected to the vortex flow meter 50 while embracing the flange 31. The transducer box 70 is fastened to the protective tube 60 by screws 43 while covering the outer periphery of an upper portion of the latter. Therefor, the displacement of the transducer box 70 caused by an external vibration is absorbed at the box side and the sensor elements 34 are not affected by the external vibration. While the sensor elements 34 in the illustrated embodiment have been described as transforming a delicate pressure variation acting on the plate 35 into a quantity of electricity, it may additionally feature a function of compensating an external vibration other than the delicate pressure variation.

Figure 4:
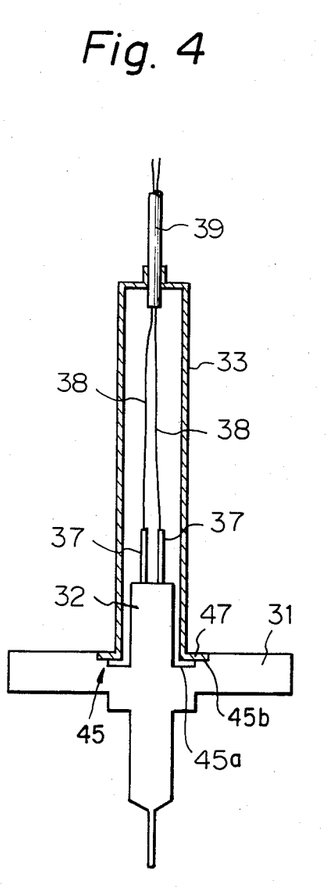
FIGS. 4–8 are fragmentary views of modifications to the embodiment shown in FIG. 3

Referring to FIGS. 4–7, various modifications to the embodiment shown in FIG. 3 are shown. In these modifications, it is to be noted that the thin tube 32 extends throughout the flange 31 in a fashion similar to that shown in FIG. 3, though FIGS. 4 to 7 illustrates these elements in such a manner as to be constructed integrally with each other. In FIG. 4, the flexible tube 33 is provided with a radially outwardly extending lid portion 47 at its lower end for the purpose of farther reducing the bending strength of the tube 33. The flange 31, on the other hand, is provided with a recess 45 around an opening formed therein throughout the cylindrical tube 32 extends. The process 45 comprises a bottom portion 45a and a stepped portion 45b. The lid portion 47 of the tube 33 is rigidly connected to the stepped portion 45b of the flange 31 by an electron beam or like fusing means while being prevented from contacting the bottom portion 45a of the recess 45 of the flange 31. With such a structure the tube 33 attains a decrease in bending strength due to a longer arm of bending moment.

Figure 5:
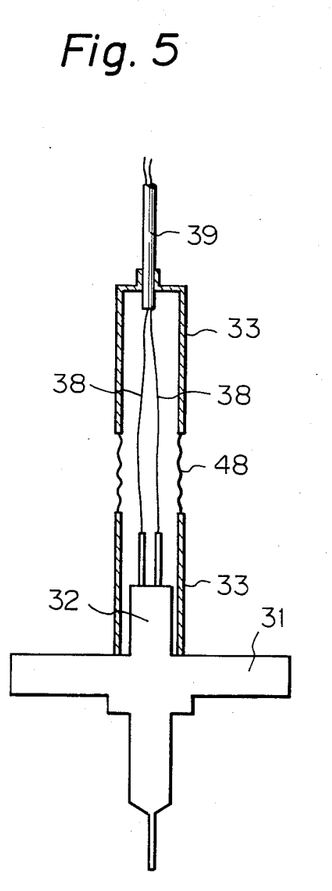

In FIG. 5, the smaller bending strength described above with reference to FIG. 4 is implemented by a bellows 48 which forms part of the flexible tube 33. Although the bellows 48 is shown in an intermediate position of the tube 33, It may be positioned adjacent to the upper or lower end of the tube 33 in which case the bending strength will become even smaller than one attainable with the FIG. 4 structure.

Figure 6:
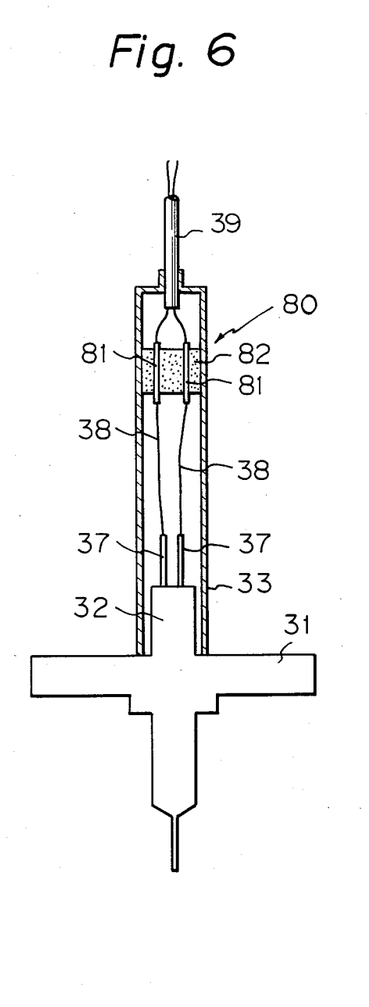

In FIG. 6, a hermetic seal 80 is disposed in the flexible tube 33 in order to retain the thin lines 38 so that the latter may be prevented from toughing the inner wall of the tube 33 to detriment the insulation. The thin lines 38 extending from the sensor elements 34 are connected to the elastic narrow tube 39 by leads 81 which are insulated from each other by an insulator 82.

Figure 7:
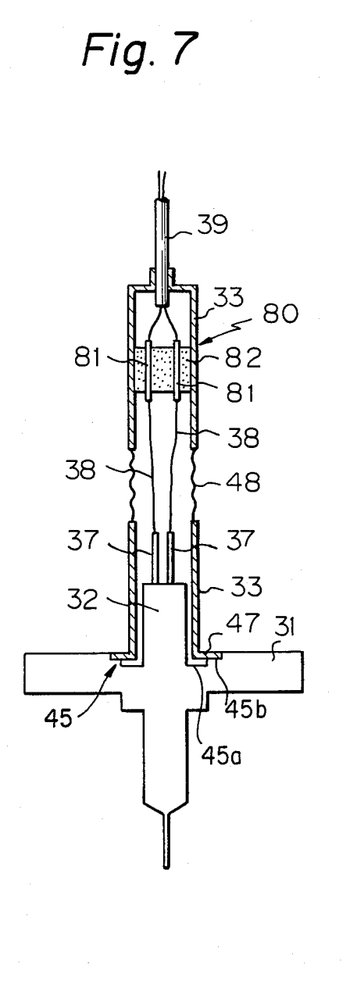

The modification shown in FIG. 7 is a combined version of the modifications described above with reference to FIGS. 4–6.

Constructed as discussed above, the second embodiment of the present invention is hardly effected by externally derived vibrations and, therefore, operable with stability in sensing vortex trains. This is because, although the moment developed by the protective tube 60 and transducer box 70 is transformed into a moment which is imparted through the elastic narrow tube 39, that moment acts on the flexible tubular member 33 and only the force transmitted through the leads 38 is allowed to act on the sensor elements 34.

Figure 8:
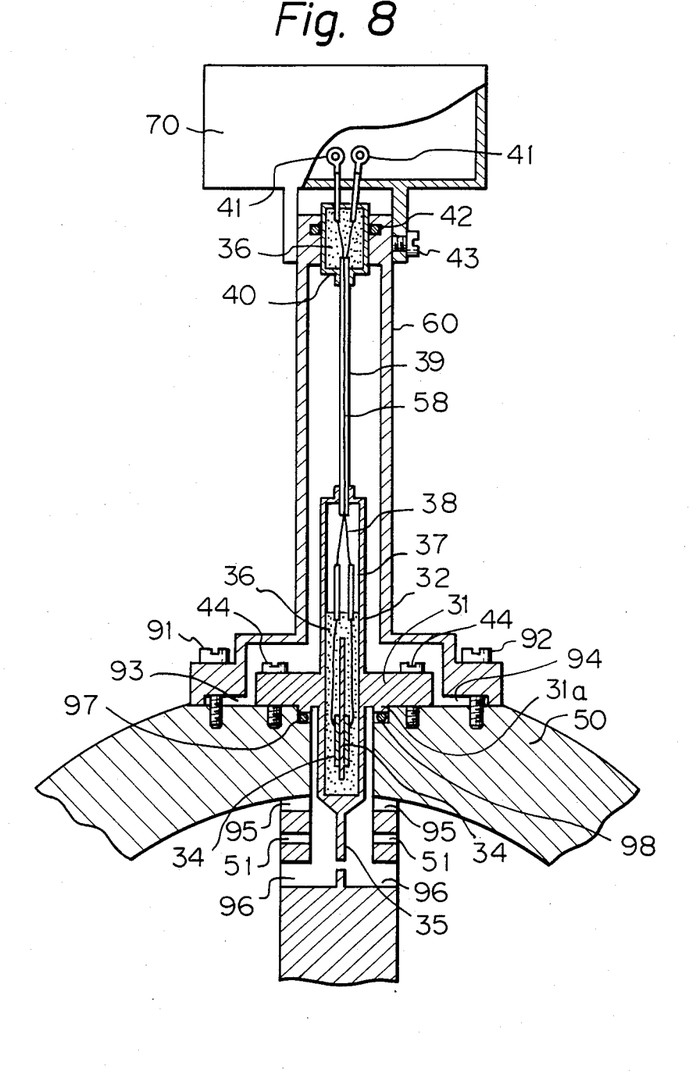

Still another modification to the embodiment of FIG. 3 is shown in FIG. 8. As shown, the protective tube 60 is fastened at its lower end to the flow meter 50 by means of screws 91 and 92 while being spaced from the latter as at 93 and 94. The spaces 93 and 94 are effective to damp mechanical vibrations. The vortex shedder in accordance with this particular modification is provided with openings 95 for removing bubbles and openings 96 for removing impurities such as dust, in addition to the pressure variation inlet openings 51. The reference numeral 97 in FIG. 8 designates a packing or an O-ring. The O-ring 97 is fitted in an annular recess 98 which is formed in the flow meter 50. The flange 31 is provided with an annular projection 31a which is engaged in the recess 98 to positively position the flange 31 relative to the flow meter 50.

What is claimed is:

1. A vortex flow meter, comprising:
    a thin-walled cylindrical tube extending throughout a center of a mounting flange and provided with a pressure receiving plate at a lower end thereof which is exposed to small pressure variations of a vortex train shed by a vortex shedder;
    sensing elements integrally mounted in said thin-walled cylindrical tube for converting a small pressure variation acting on said pressure receiving plate to an electrical signal;
    a flexible tubular member rigidly connected to the mounting flange coaxially with the thin-walled cylindrical tube in such a manner as to surround the thin-walled cylindrical tube;
    a hermetically sealed elastic narrow tube connected at one end to the tubular member;
    a hermetically sealed terminal block connected to the other end of the elastic narrow tube;
    the electrical signal being outputted sequentially via said flexible tubular member, said elastic narrow tube and said terminal block; and
    a protective tube slidably coupled on an outer periphery of the terminal block and fixed in place while surrounding the flexible tubular member, the elastic narrow tube and the mounding flange.

2. A vortex flow meter as claimed in claim 1, wherein the flexible tubular member has a radially outwardly extending lid portion at an end thereof, the mounting flange being provided with a recess around an opening formed therein throughout which the thin-walled cylindrical tube extends, said recess being formed with a bottom portion and a stepped portion, said lid portion of the flexible tubular member and the bottom portion of said recess being held out of contact with each other.

3. A vortex flow meter as claimed in claim 2, wherein part of the flexible tubular member comprises a bellows.

4. A vortex flow meter as claimed in claim 3, wherein leads extending out from the sensing elements inside the flexible tubular element are connected with the intermediary of an insulating material.

5. A vortex flow meter as claimed in claim 4, wherein the insulating material comprises a hermetic seal.

6. A vortex flow meter as claimed in claim 5, wherein the elastic narrow tube comprises a sheath wire.

7. A vortex flow meter as claimed in claim 1, wherein part of the flexible tubular member comprises a bellows.

8. A vortex flow meter as claimed in claim 7, wherein part of the flexible tubular member comprises a bellows.

9. A vortex flow meter as claimed in claim 8, wherein the insulating material comprises a hermetic seal.

10. A vortex flow meter as claimed in claim 9, wherein the elastic narrow tube comprises a sheath wire.

11. A vortex flow meter as claimed in claim 1, where leads extending out from the sensing elements inside the flexible tubular element are connected with the intermediary of an insulating material.

12. A vortex flow meter as claimed in claim 11, wherein the insulating material comprises a hermetic seal.

13. A vortex flow meter as claimed in claim 12, wherein the elastic narrow tube comprises a sheath wire.

14. A vortex flow meter as claimed in claim 1, wherein the insulating material comprises a hermetic seal.

15. A vortex flow meter as claimed in claim 14, wherein the elastic narrow tube comprises a sheath wire.

16. A vortex flow meter as claimed in claim 1, wherein the elastic narrow tube comprises a sheath wire.

* * * * *